April 22, 1952     J. M. GOLDBERG     2,593,748
FISHING REEL

Filed Aug. 29, 1949     2 SHEETS—SHEET 1

INVENTOR.
BY JACOB M. GOLDBERG
Bertha L. MacGregor
Attorney

INVENTOR.
BY JACOB M. GOLDBERG
Bertha L. MacGregor
Attorney

Patented Apr. 22, 1952

2,593,748

UNITED STATES PATENT OFFICE 2,593,748

FISHING REEL

Jacob M. Goldberg, Denver, Colo.

Application August 29, 1949, Serial No. 113,012

2 Claims. (Cl. 242—84.5)

This invention relates to fishing reels, and the main object of the invention is to provide a reel which is compact in form, efficient in operation and simple in construction.

It is important in the art of fishing to control the line at all times, to provide for free, frictionless passage of the line from the spool for casting purposes, and to provide for controlled playing out and retrieving of the line after the bait has been taken. I have provided simple and efficient mechanism for the purposes stated, easily controllable by the fisherman without distracting his attention from the task of landing the fish.

Another advantage is the provision of mechanism whereby the playing out of the line is achieved without backlash.

These and other advantages will appear from the drawings and the following description of my improved fishing reel.

Figure 1:
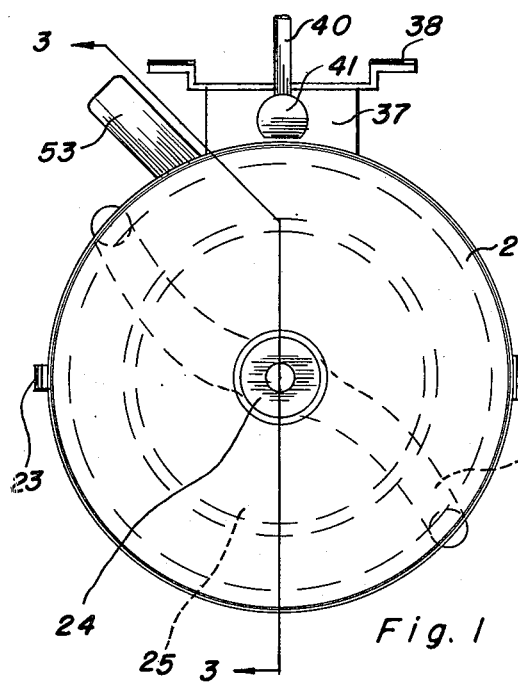
Fig. 1 is an elevational view of one side of a fishing reel embodying my invention, showing the line control lever in position for winding in the line or for controlled "playing out" of the line.
Figure 2:
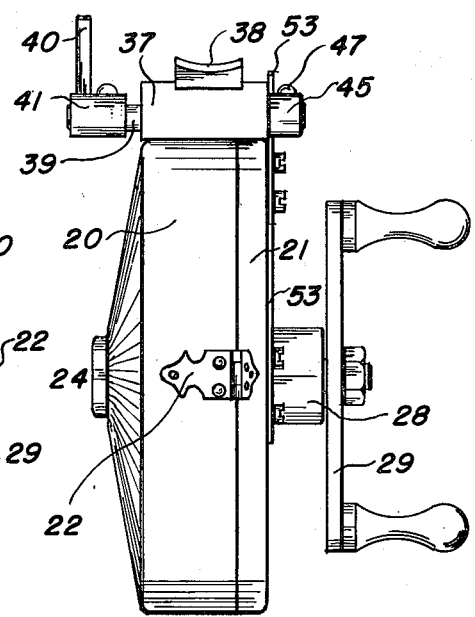
Fig. 2 is an elevational view of the peripheral portion of the casing of the fishing reel.

In the preferred embodiment of my invention shown in the drawings, and referring particularly to Figs. 1 to 4, inclusive, my fishing reel comprises a two part casing, the side usually held toward the left of the user being indicated at 20 and the opposite side at 21. The members 20 and 21 are hinged together at their peripheral edges by a hinge 22 and are retained in closed position by a latch 23. The casing 20 has a centrally located grommet 24 through which the line 19 is passed from a spool 25 provided with spaced apart flanges 26 between which the line is retained on the spool. The spool is fixed on a stub shaft 27' loosely mounted in a sleeve shaft 27 rotatable in a hub 28 which is concentrically located on the casing 21. A two armed handle 29 is fixed on the sleeve shaft 27 to rotate said shaft.

Figure 3:
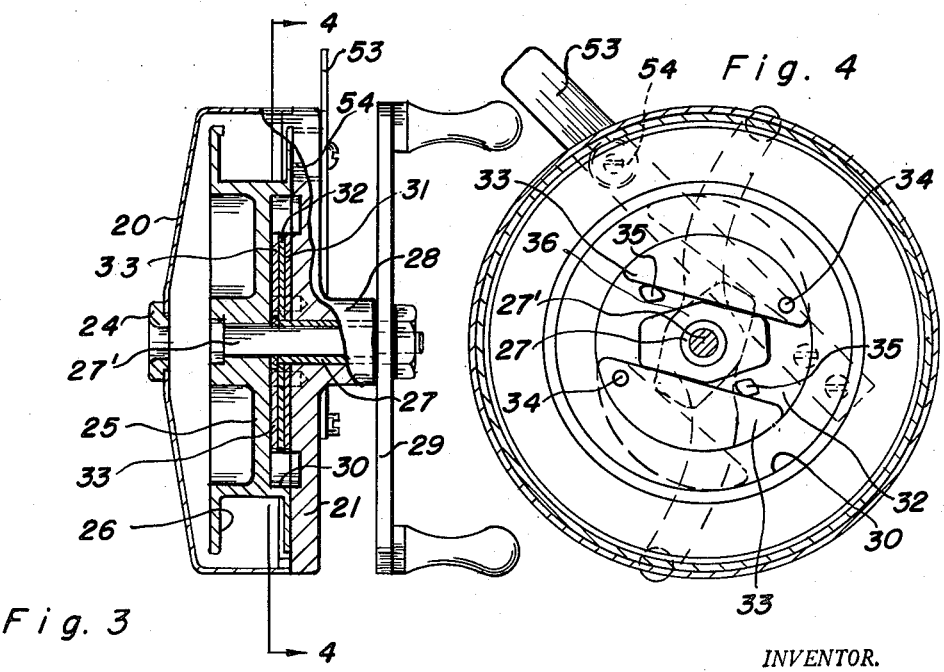
Fig. 3 is a sectional view, partly in elevation, taken in the plane of the line 3—3 of Fig. 1.
Figure 4:
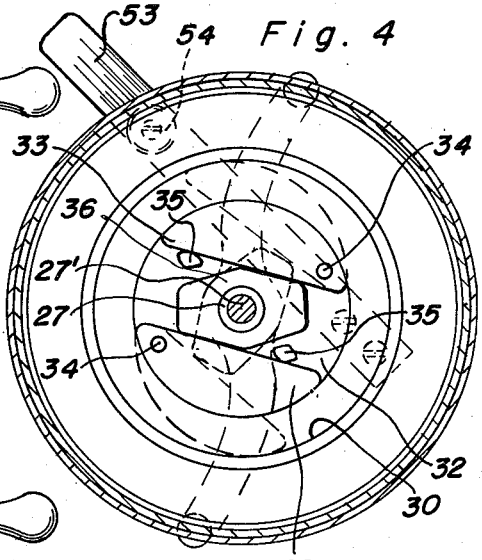
Fig. 4 is a sectional view taken in the plane of the line 4—4 of Fig. 3, showing the spool driving mechanism in elevation.
Figures 11, 12:
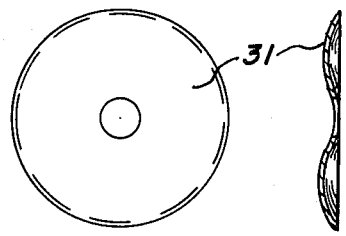
Fig. 11 is an elevational view of a spring located between the spool driving means and casing.
Fig. 12 is a sectional view of the spring shown in Fig. 11.

Spool driving mechanism is best shown in Figs. 3 and 4. It comprises an annular shoulder 30 formed on the spool 25 on that side facing the casing 21. Mounted on the inner surface of the casing 21, opposite the cup shaped recess formed on the spool by said annular shoulder 30, is a spring 31 (Figs. 11 and 12) which bears against a circular disk 32 on which are mounted two identical cams 33 by pivot pins 34. The sleeve 27 extends centrally through said spring 31 and disk 32. The disk 32 has formed thereon a pair of stops 35 which limit the rotary movement of a cam 36 mounted on and rotatable with the sleeve 27. When the handle 29 is turned, the sleeve 27 rotates cam 36, and in one direction of rotation said cam 36 engages the straight edges of the cams 33, forcing the curved edges of said cams 33 into driving engagement with the annular shoulder 30 of the spool 25, thus rotating the spool for the purpose of rewinding the line on the spool.

When the line is drawn out of the reel, off the periphery of the spool 25, that is when the line is being "played out" in the act of landing a fish which has taken the bait, the unwinding rotation of the spool 25 transmits rotary motion to the disk 32 through the frictional engagement between said spool and disk 32, whereupon the cam 36 engages the stops 35 and continued rotation of the disk 32 thus transmits rotary motion to the sleeve shaft 27 and handle 29 in a direction opposite to that which takes place when the handle is operated for rewinding the line on the spool.

Figure 5:
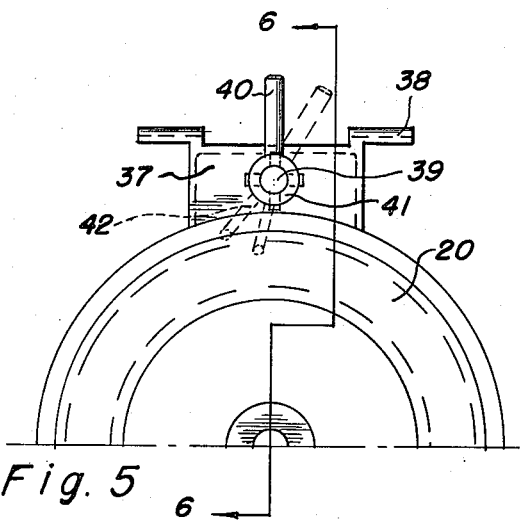
Fig. 5 is an elevational view of part of the casing and of the line control lever.
Figure 6:
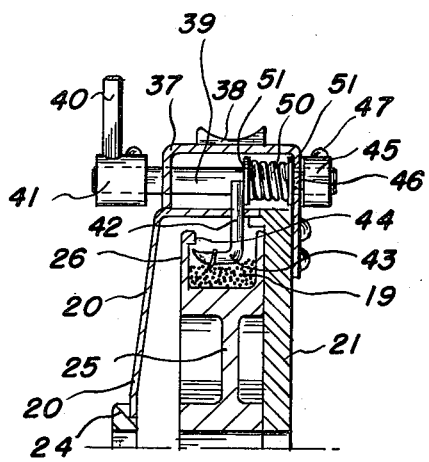
Fig. 6 is a sectional view taken in the plane of the line 6—6 of Fig. 5.

Line control mechanism is mounted on the casing member 21 and extends across the peripheries of both casing members 20 and 21. Said mechanism comprises a housing 37 in which is mounted the operative parts about to be described. The housing 37 also supports a pole rest 38. Referring to Figs. 5 and 6, a shaft 39 is rotatably mounted in the housing 37, with its ends projecting from opposite side walls of the housing 37. One end of the shaft 39 has rigidly connected thereto a control lever 40 by any suitable means such as the part 41. Movement of the lever 40 rocks the shaft 39 to a limited degree about its axis.

Rigidly secured to the shaft 39 between its ends, is a leg 42 which terminates in a foot 43 which in one of its two positions engages an undercut flange 44 on the spool flange 26. The leg 42 is moved into engagement with the said flange 44 by moving the control lever 40 to its perpendicular position as shown in solid lines in Fig. 5. Said leg 42 is moved out of engagement with the spool flange 44 when the lever 40 is moved to the dotted line position of Fig. 5.

Figures 7, 8:
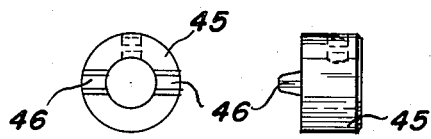
Fig. 7 is an elevational view of a detached part of the line control mechanism.
Fig. 8 is a side elevational view of the same.
Figure 9:
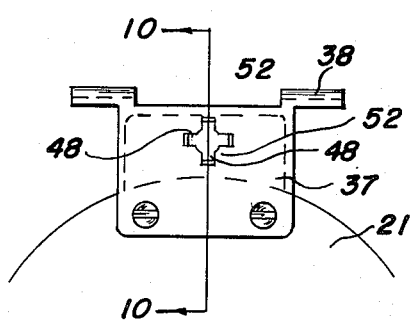
Fig. 9 is an elevational view of one side of the housing in which the line control mechanism is mounted.
Figure 10:
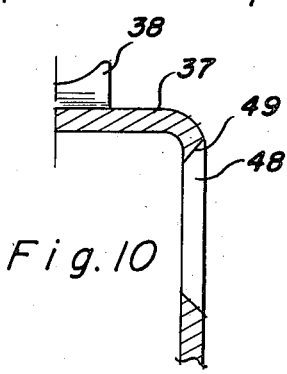
Fig. 10 is a fragmentary sectional view, enlarged, taken in the plane of the line 10—10 of Fig. 9.

The mechanism for controlling the position of the leg 42 comprises a collar 45 fixed on the projecting end of the shaft 39. This collar is shown in Fig. 6, and as detached in Figs. 7 and 8. The collar 45 is provided on its inner end with two cams 46 and it is fixedly held on the shaft 39 by the set screw 47. The cams 46 engage recesses 48 (Fig. 9) defined by beveled edges 49 (Fig. 10), which facilitate the movement of the cams 46 into and out of the recesses 48 when the collar 45 is moved by the rocking of the shaft 39. A coiled spring 50 on the shaft 39 is retained between plates 51 loosely mounted on the shaft. When the lever 40 is perpendicularly disposed, as shown in Fig. 5 in solid lines, the cams 46 on the collar 45 are located within the recesses 48, and when the lever 40 is inclined as shown in dotted lines in Fig. 5, the cams 46 ride onto the edge 49 to the housing surfaces 52 intermediate said recesses 48. The actuation of the control lever 40 produces the rocking movement of the shaft 39, and with it of the collar 45, and this movement of the collar 45 and cams 46 imparts longitudinal, axial movement to the shaft 39.

A brake lever 53 is provided with a brake lining or button 54 for bearing on the spool through an aperture in the casing 21, to aid in controlling the rotation of the spool.

The operation of the reel is as follows: When the fisherman is preparing for casting, he moves the control lever 40 to the dotted line position of Fig. 5. This action rocks the shaft 39 and collar 45, causing the cams 46 to move out of the recesses 48 onto the surfaces 52 of the housing 37. The effect is to move the leg 42 out of engagement with the undercut flange on the spool flange 26 and into a position where it does not interfere with the free passage of the line from the spool without rotation of the spool. Thus the line leaves the spool, passing over the side into the space between the spool 25 and casing 20, and out through the grommet 24, without any frictional hindrance of any kind, as is very desirable for casting.

When the fish has taken the bait, the fisherman shifts the control lever 40 to the perpendicular position shown in solid lines in Fig. 5, and this rocks the shaft 39 and collar 45 and causes the cams 46 to enter the recesses 48, resulting in the movement of the leg 42 into the space between the spool flanges 26 and engagement of the foot 43 with the undercut flange 44 on the spool flange 26, as shown in Fig. 6. This prevents the line from leaving the spool by passing over the side of the spool and makes it necessary for the spool to rotate in order to allow the line to be drawn off from the periphery of the spool. As heretofore explained, such drawing off of the line is retarded by the fact that the line cannot leave the spool without rotation of the spool and this is achieved with a degree of friction exerted on the spool by the driving mechanism.

After the fish has been landed, the line is rewound by actuation of the handle while the control lever is in the perpendicular position and the line is held between the spool flanges 26.

It will be understood that by an easy, simple movement of the control lever 40, the fisherman is assured of (1) free, frictionless passage of the line from the spool, without rotation of the spool, (2) of controlled playing out of the line with resultant spool rotation retarded by the drag of the spool driving mechanism, and (3) by manual rotation of the handle 29 the line is rewound on the spool.

Changes may be made in details of construction and form of the parts without departing from the scope of my invention as set forth in the appended claims.

I claim:

1. A fishing reel comprising a casing, a line carrying flanged spool rotatably mounted in the casing, means for rotating the spool, one of the spool flanges having an undercut circumferential edge, and line controlling mechanism including a line engaging leg pivotally mounted radially opposite the peripheral portion of the spool and means for moving the leg into line engaging position between the spool flanges in contact with said undercut spool flange.

2. A fishing reel comprising a casing, a line carrying flanged spool rotatably mounted in the casing, means for rotating the spool, one of the spool flanges having an undercut circumferential edge, and line controlling mechanism comprising a rock shaft, a line engaging leg rigidly secured to the rock shaft radially opposite the peripheral portion of the spool, and a lever for rocking the shaft and thereby moving said leg into and out of engagement with said undercut spool flange.

JACOB M. GOLDBERG.

REFERENCES CITED

The following references are of record in the file of this patent:

UNITED STATES PATENTS

| Number | Name | Date |
| --- | --- | --- |
| 929,867 | Meisselbach et al. | Aug. 3, 1909 |
| 2,510,447 | Wheat | June 6, 1950 |

FOREIGN PATENTS

| Number | Country | Date |
| --- | --- | --- |
| 17,250 | Great Britain | July 20, 1910 |
| 383,432 | Great Britain | Nov. 17, 1932 |
| 828,000 | France | Feb. 2, 1938 |
| 839,627 | France | Jan. 4, 1939 |